April 6, 1943.  W. A. RIDDELL  2,316,020
AUTOMATIC SHUTTER
Filed Feb. 17, 1942
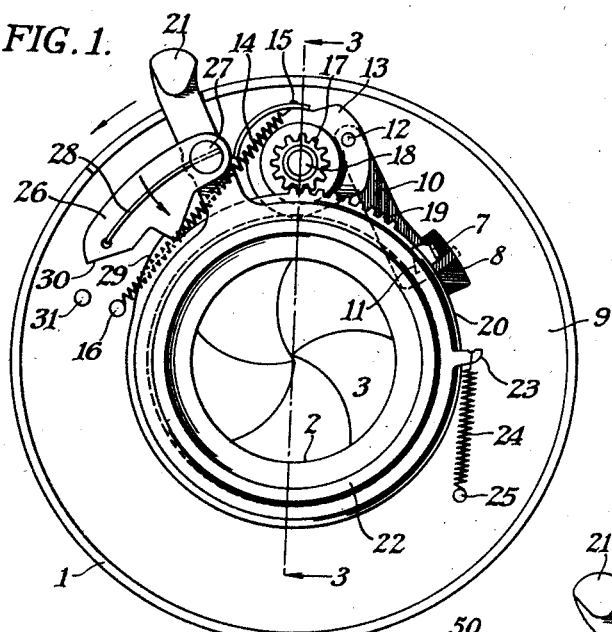
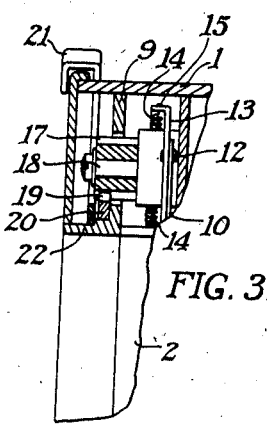
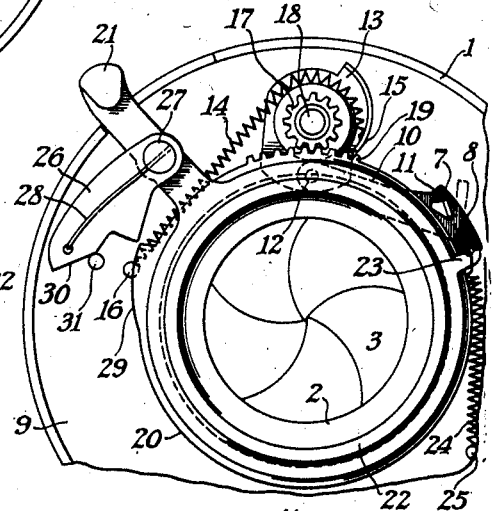
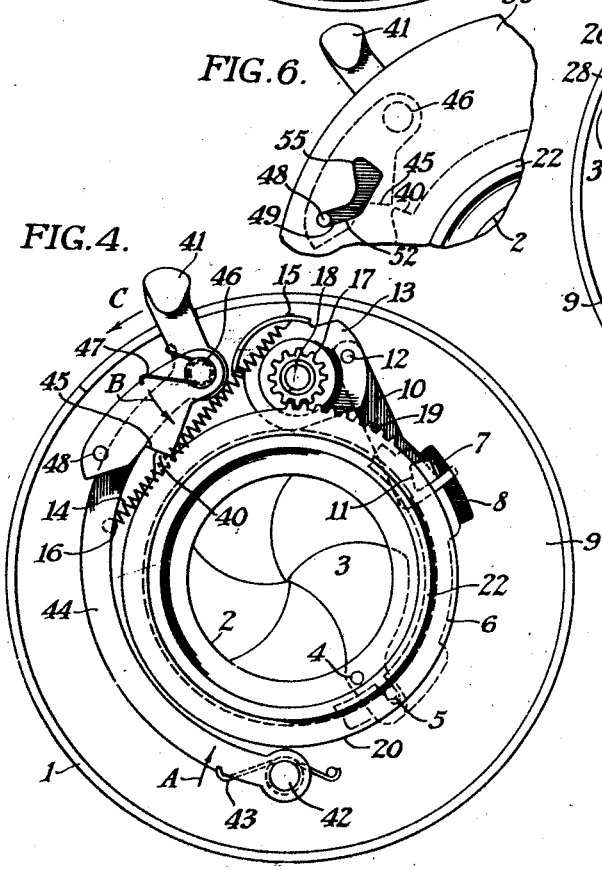
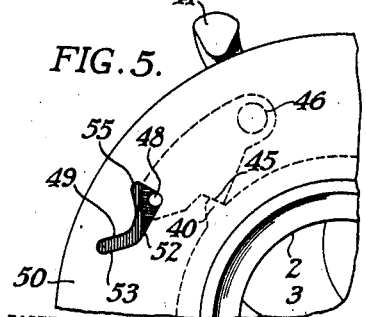
WILLIAM A. RIDDELL
INVENTOR
BY
ATTORNEYS Patented Apr. 6, 1943

2,316,020

UNITED STATES PATENT OFFICE 2,316,020

AUTOMATIC SHUTTER

William A. Riddell, Rochester, N. Y., assignor to Eastman Kodak Company, Rochester, N. Y., a corporation of New Jersey Application February 17, 1942, Serial No. 431,279

7 Claims. (Cl. 95—63)

This invention relates to photography and more particularly to camera shutters. One object of my invention is to provide a simple and inexpensive type of shutter which can be used for obtaining relatively high shutter speeds. Another object of my invention is to provide a shutter which is simple to operate and which contains relatively few parts. Other objects will appear from the following specification, the novel features being particularly pointed out in the claims at the end thereof.

In the past, it has usually been difficult to obtain relatively high shutter speeds unless a shutter of the so-called setting type is used in which a power spring is manually placed under tension, after which it may be released by a trigger to make an exposure. In the early days shutters were known in which a single member was used for both setting the shutter and tripping it. Sometimes the trigger was moved in an upward direction for setting the shutter mechanism and in a reverse direction for tripping it.

It has also been known to provide shutters with mechanisms much like the normal shutter setting mechanism, but which mechanism would be first set and then released by means of a single actuation of a trigger and in this manner comparatively high speeds could be obtained with a simple type of shutter.

In my improved shutter I have provided a relatively simple connecting mechanism between a shutter master member and a shutter trigger so that the first part of the movement of the trigger winds up and places under tension a master member power spring and continued movement of the trigger after the spring has been properly tensioned releases it to make an exposure. It is thus possible to obtain exposures which are considered quite fast, as for instance 1/400 of a second, in a shutter having an exposure opening clearance of 1¼". As is obvious to those skilled in the art, the larger the shutter opening the slower the exposure because it is necessary to make the shutter leaves travel a greater distance when the opening is large than when the shutter opening is small.

Coming now to the drawing wherein like reference characters denote like parts throughout:

Fig. 1 is a plan view of a shutter constructed in accordance with one embodiment of my invention showing the shutter leaf operating mechanism and with the shutter cover removed;

Fig. 2 is a fragmentary view similar to Fig. 1 but with the parts in a different position;

Fig. 3 is a fragmentary section taken on line 3—3 of Fig. 1;

Fig. 4 is a view similar to Fig. 1 but of a second and preferred embodiment of my invention;

Fig. 5 is a fragmentary detailed view showing a portion of the shutter mechanism of Fig. 4; and Fig. 6 is a fragmentary view similar to Fig. 5, but with the parts in a different position.

Referring to Fig. 1, the shutter casing 1 may be provided with the usual exposure aperture 2 covered by shutter leaves 3 which, as best shown in Fig. 4, may be pivotally mounted on suitable studs 4 and may include pins 5 operable by a blade ring 6 when a lug 7 projecting upwardly through a slot 8 in the mechanism plate 9 is oscillated.

The means for oscillating the lug 7 is a crank arm 10 provided with a hook-like end 11 which engages the lug 7 to open and close the shutter leaves when the hook is moved in a counterclockwise direction, the latch member passing idly about the upstanding lug 7 when it is turned in a clockwise direction.

The latch member 10 is preferably pivotally attached at 12 to a master member 13, this member being normally turned in a counter-clockwise direction by means of a spring 14 attached to the master member at 15 and to the shutter mechanism plate 9 by means of a screw 16. The master member carries gear teeth 17 in the form of a pinion mounted on the stud 18 on which the master member turns.

In the form of my invention shown in Fig. 1, gear teeth 19 on a curved rack 20 are positioned to mesh with the gear teeth carried by the master member so that as the master member turns in a counter-clockwise direction the rack may turn in a reverse direction.

In order to make an exposure the master member 13 must be placed under tension, its tension position being indicated in Fig. 2. In order to accomplish this, a trigger member 21 is provided and in this form of my invention the trigger member is mounted to turn on the shutter plate ring 22 as indicated in Figs. 1 and 3. The trigger member is provided with an outstanding lug 23 to which a spring 24 is attached, this spring encircling a pin 25 on the mechanism plate to normally hold the trigger 21 in its Fig. 1 position. This is the position the trigger assumes at the end of an exposure. To make an exposure the trigger 21 is moved in a direction shown by the arrow Fig. 1. This causes a latch member 26 which is pivoted at 27 to the trigger and which is pressed in the direction shown by the arrow by a spring 28 to engage a latch element 29 carried by the rack 19. Thus, as the trigger is moved in a downward direction or in a counter-clockwise direction with respect to Fig. 1, the latch element 26 carries along the latch element 29 until the position in Fig. 2 is reached in which it will be seen that the spring 14 has been wound up and the master member 13 is now in a position to be released to operate the shutter leaves through the blade ring lug 7 and the latch 10. When this position is reached a cam 30 on the end of the latch member 26 is engaged by an abutment 31, such as a pin on the mechanism plate 9. This cams the latch element 26 away from latch element 29 and as soon as these latch elements become disengaged, the rack 19 is freed so that the master member 13 may swing rapidly under the impulse of its spring 14 to drive the latch element 10 from the position shown in Fig. 2 to the position shown in Fig. 1.

This movement causes the hook 11 to oscillate the pin 7 back and forth thus causing the shutter leaves 3 to open and close. No separate shutter setting is required.

In a preferred embodiment shown in Figs. 4-6 inclusive, the master member and shutter leaf driving mechanism are all identical to those described for the first embodiment of my invention. This is also true of the rack member 19 which has, however, a comparatively short and sharply formed latch element 40. The primary difference between the two embodiments is that in this form of my invention the trigger member 41 is pivotally mounted on a pin 42 carried by the mechanism plate 9 and is held by means of a spring 43 in the position shown by the arrow A adjacent the pivot 42. Thus the trigger arm 41 consists of a curved lever 44 carrying a latch element 45 which is pivoted at 46 to the trigger and which is held in a direction shown by the arrow B by means of a spring 47. The latch element 45 carries an upstanding pin 48 which engages a cam slot 49 in an upper shutter plate 50 as best shown in Figs. 5 and 6.

When an exposure is to be made the trigger 41 is moved in the direction shown by the arrow C causing the latch element 45 to carry the latch element 40 on the rack 19 along with it as the pin 48 rides in the cam slot 49. As the pin rides on a straight line portion 52 of the cam slot the master member 13 is wound up. When it is wound up, the pin engages the end portion 53 of the cam slot gradually moving the latch element 45 away from the rack latch element 40 until it reaches the Fig. 6 position in which the master member 13 may operate the shutter leaves 3 to make an exposure in the manner described by the first embodiment of my invention. Upon releasing the trigger 41, it is moved rearwardly and, since the cam slot is provided with an enlarged end 55, when the latch element 45 reaches the latch element 40, the pin 48 may move freely in the enlarged end 55 as the latch element 45 snaps over the latch element 40 to again position the parts for making an exposure.

With both of the above described embodiments of my invention it will be noticed that the first part of the trigger movement winds up the master member permitting the latch 10 to oscillate idly past the upstanding lug 7 on the blade ring and to tension the spring 14 for making an exposure. In each of the embodiments of my invention the trigger member carries a latch which causes the movement above described and which, after a predetermined travel, releases the master member so that it may operate to make an exposure. In each instance this construction makes possible a shutter in which a single lever both sets and releases a master member.

I claim:

1. In a camera shutter, the combination with a shutter casing having an exposure aperture therein, leaves movably mounted over the exposure aperture, an oscillatable master member, operable connections between the master member and the shutter leaves, gear teeth carried by the master member, a spring for driving the master member in one direction, a movable rack meshing with the teeth of the master member, a latch element on the rack, a trigger including a latch element positioned to engage and move the latch on the rack and means operable by moving the trigger for releasing the latch elements after a predetermined travel of the trigger to set and release the master member to make an exposure.

2. In a camera shutter, the combination with a shutter casing having an exposure aperture therein, leaves movably mounted over the exposure aperture, an oscillatable master member, operable connections between the master member and the shutter leaves, gear teeth carried by the master member, a spring for driving the master member in one direction, a movable rack meshing with the teeth of the master member, a latch element on the rack, a trigger including a latch element positioned to engage and move the latch on the rack and an abutment on the shutter for moving the trigger latch from the rack latch at a predetermined point in the travel of said trigger.

3. In a camera shutter, the combination with a shutter casing having an exposure aperture therein, leaves movably mounted over the exposure aperture, an oscillatable master member, mounted to turn on the shutter casing, operable connections between the shutter leaves and the master member, a spring tending to turn the master member in one direction, gear teeth carried by the master member, a pivotally mounted rack meshing with the teeth on the master member, means for moving the rack to set and release the master member comprising a pivotally mounted trigger mounted to move through a path, latch elements carried by the rack and trigger positioned for engagement throughout the greater part of the path of movement of the trigger and to separate thereafter whereby movement of the trigger in one direction may set and release the master member to make an exposure.

4. In a camera shutter, the combination with a shutter casing having an exposure aperture therein, leaves movably mounted over the exposure aperture, an oscillatable master member, operable connections between the master member and the shutter leaves, gear teeth carried by the master member, a spring for driving the master member in one direction, a movable rack meshing with the teeth of the master member, a latch element on the rack, a trigger, a latch element hinged to the trigger, a spring normally holding the latch in a position to engage the latch element of the rack, an abutment on the shutter in the path of movement of the hinged latch element to engage and trip said latch when the trigger is moved, the position of said abutment being such that said latch may move the rack through the latch thereon until said rack has turned the master member to a set position whereby the release of said hinged latch may release said master member to make an exposure.

5. In a camera shutter, the combination with a shutter casing having an exposure aperture therein, leaves movably mounted over the exposure aperture, an oscillatable master member, operable connections between the master member and the shutter leaves, gear teeth carried by the master member, a spring for driving the master member in one direction, a movable rack meshing with the teeth of the master member, a latch element on the rack, a trigger, a latch pivotally attached to the trigger, a cam on the shutter, a cam follower on the latch, the cam being shaped to hold the pivoted latch element in engagement with the movable rack latch element throughout the greater part of the movement thereof and having a curved end to separate the latch elements when said rack approaches the end of its movement in one direction, to first set and then release the master member.

6. In a camera shutter, the combination with a shutter casing having an exposure aperture therein, leaves movably mounted over the exposure aperture, an oscillatable master member, operable connections between the master member and the shutter leaves, gear teeth carried by the master member, a spring for driving the master member in one direction, movable rack meshing with the teeth of the master member, a latch element on the rack, a trigger, a latch pivotally attached to the trigger, a cam on the shutter, a cam follower on the latch, the cam being shaped to hold the pivoted latch element in engagement with the movable rack latch element throughout the greater part of the movement thereof and having a curved end to separate the latch elements when said rack approaches the end of its movement in one direction, to first set and then release the master member said cam including an offset area at the end opposite to the curved end thereof to permit said hinged latch to snap into engagement with the rack latch at one end of the path of movement of said rack.

7. In a camera shutter, the combination with a shutter casing having an exposure aperture therein, leaves movably mounted over the exposure aperture, an oscillatable master member, operable connections between the master member and the shutter leaves, gear teeth carried by the master member, a spring for driving the master member in one direction, a movable rack meshing with the teeth of the master member, a latch element on the rack, a trigger, a movable latch element carried by the trigger, including a cam follower, a cam slot carried by the shutter and having a major portion extending arcuately about the trigger pivot, having one end curved from said arcuate path and having the other end widened out whereby the movable latch element may be guided to engage and move the rack through the latch element through a force applied to the trigger to first set the master member and release the master member when said cam follower moves the latch from the rack latch through the curved end in the cam.

WILLIAM A. RIDDELL.